(12) United States Patent
Song

(10) Patent No.: US 7,061,893 B2
(45) Date of Patent: Jun. 13, 2006

(54) APPARATUS AND METHOD FOR SYNCHRONIZING FRAME AND DETECTING CODE GROUP/NUMBER

(75) Inventor: Jae Wook Song, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 977 days.

(21) Appl. No.: 10/029,199

(22) Filed: Dec. 28, 2001

(65) Prior Publication Data

US 2002/0085527 A1    Jul. 4, 2002

(30) Foreign Application Priority Data

Dec. 29, 2000    (KR) ............................... 2000-85818

(51) Int. Cl.
   *H04B 7/212*    (2006.01)
(52) U.S. Cl. ...................... 370/337; 370/342
(58) Field of Classification Search ............... 370/335, 370/336, 337, 342, 324, 350, 503, 509
   See application file for complete search history.

(56) References Cited

U.S. PATENT DOCUMENTS

| 6,157,619 | A  | * | 12/2000 | Ozluturk et al. ............ 370/252 |
| 6,512,737 | B1 | * | 1/2003  | Agee ........................ 370/208 |
| 6,831,940 | B1 | * | 12/2004 | Harms et al. ................ 375/130 |
| 2002/0057664 | A1 | * | 5/2002  | Sarkar ....................... 370/342 |

\* cited by examiner

*Primary Examiner*—Wellington Chin
*Assistant Examiner*—Kevin Mew
(74) *Attorney, Agent, or Firm*—Fleshner & Kim, LLP

(57) ABSTRACT

The present invention relates to an apparatus for synchronizing frame and detecting code group/number that is useful for an initial cell search of an asynchronous IMT-2000 system. To this end, the present invention discloses a method for synchronizing frame and detecting code group/number, including the steps of: synchronizing a slot at the time of a system booting, wherein the system obtains time offsets by using at least two despreaders with different timings from each other; detecting energies and time offsets based on the designated position of the slot timing; and detecting frame synchronization and code group/number by using the detected energies and information.

15 Claims, 4 Drawing Sheets

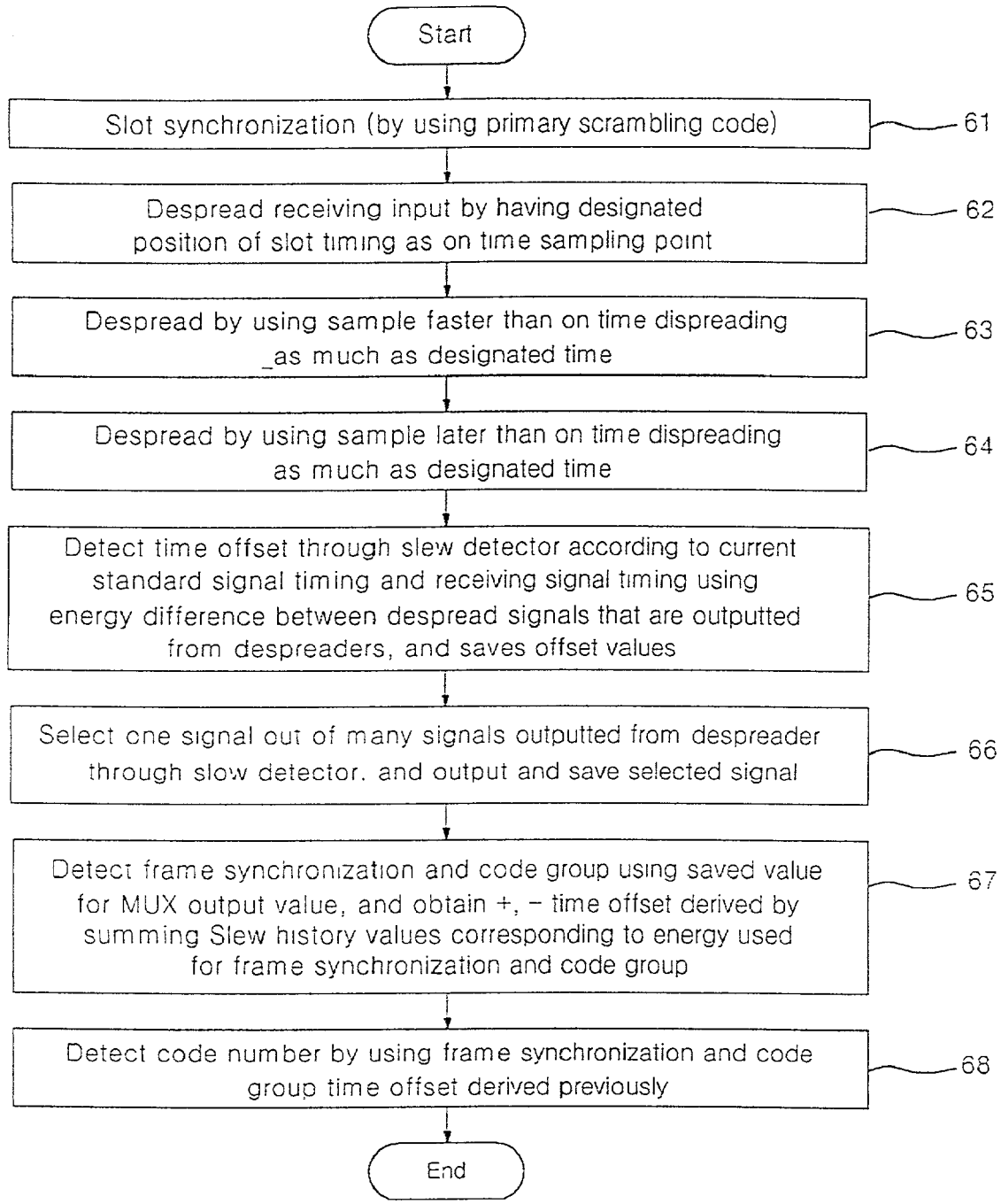

APPARATUS AND METHOD FOR SYNCHRONIZING FRAME AND DETECTING CODE GROUP/NUMBER

BACKGROUND OF THE INVENTION

1. Field of the Invention

The present invention relates to an apparatus and a method for synchronizing frame and detecting a code group/number, which is applicable to initial cell search in 3GPP (Global Partner Program) asynchronous International Mobile Telecommunication (IMT)-2000 system. In particular, the present invention relates to an apparatus for synchronizing frame and detecting a code group/number with a tracking function to minimize degradation due to a frequency offset that is generally caused by timing difference between a receiving signal from a terminal and an internally generated signal in a base station, and a method thereof.

2. Description of the Related Art

To begin with, an apparatus for synchronizing frame and detecting a code group/number typically used in the related art is explained.

FIG. 1 is a block diagram showing the traditional procedure of synchronizing frame and detecting a code group/number.

As depicted in the diagram, the apparatus includes an on time despreader 10 for dispreading a receiving input by having a slot timing's position that is designated after slot synchronization as a sampling point; an energy storage 11 for storing outputted energy from the one time despreader; a frame synchronization and code group detector 12 for detecting frame synchronization and code groups by using the outputted values from the storage; and a code number detector 13 for detecting code numbers using the outputted values from the frame synchronization and code group detector 12.

The on time despreader further includes an integrate-dump circuit composed of a multiplier 10a and a integrator 10b for operating a receiving signal; a fast hadamard transformer (FHT) 10c for performing a fast hadamard transformation on the integrate-dumped value; and a squarer 10d for obtaining a despreaded energy.

The operation of the traditional apparatus for synchronizing frame and detecting a code group/number shown in FIG. 1 is now explained with reference to FIG. 2.

At first, synchronization of a slot is initiated at the time of system booting (S20).

Once the slot is synchronized, the on time despreader 10 despreads a receiving input having a position of a designated slot timing as a sampling point, and outputs the receiving input to an energy storage. Using the outputted value from the storage, the frame synchronization and code group detector 12 outputs information about the frame synchronization and the code group to the code number detector 13 (S21), in which an appropriate code number is detected (S22).

Unfortunately though, the previous asynchronous IMT-2000 system is often degraded due to a frequency offset that is originally caused by a decrease in the extracted energy for changing the position of the sampling during the normal operational procedure.

Typically, the frequency offset of the terminal and the base station during the initial cell search procedure is 3 PPM, which corresponds to 6 Khz in 2 GHz band. However, if the Doppler effect is taken into consideration, any frequency close to 7 Khz will go off as well.

In such case, even with the change of 1 frame (10 msec), a local clock (an internally generated signal) could be approximately Tc/8 ahead or behind of the receiving signal. This means that when 4 frames are passed, the local clock will be off by plus and minus ½, and the synchronization itself fails. (See FIG. 3 for reference.)

For better understanding, the following has been taken as an example.

FIG. 3 diagrammatically shows the state of detected energy according to the timing difference of internally generated signals corresponding to receiving signals in a frame synchronization and code group detector.

In the drawing, Y-axis indicates the energy values obtained by the despreader, and X-axis indicates the timing difference between the receiving signals and the internally generated signals.

Since the internally generated synchronous codes are generated by a digital domain, the energy spread thereof is indicated as ±Tc/2.

The point A in FIG. 3 illustrates a case where a maximum energy is detected particularly when the receiving signal and the internally generated signal are completely in accord with each other. Here, it is observed that as the timing difference from the point A gets larger, the detected energy decreases, eventually reaching "0".

The point to get "0" is generated when the internally generated signal timing is ±½ chip against the receiving signal timing, and the corresponding energy distribution has the symmetric shape, as depicted in FIG. 3.

If the input signal sampling of the slot synchronization circuit starts at the point A of FIG. 3, operating 1 frame, and 7 Khz frequency offset is generated to the same direction as shown in FIG. 3, the internal generation time (the point B in FIG. 3) resulted from the slot synchronization is different from the receiving signal by Tc/8.

This indicates that the energy at the point B, compared with the point A, is decreased to a great extent. Similarly, if the frame synchronization and code number detector is operated on the point B by 1 frame, the internally generated time reaches to the point C. When the code number detector is operated once again, the location of the timing becomes the point D, where the timing difference from the original timing is as much as 3Tc/8. In such case, it becomes pretty difficult to distinguish the energy on the point C obtained from a noisy environment since the energy can be regarded as almost another form of noise.

In the meantime, since the initial cell searcher operates 2 or 3 frames, although it might be possible to initiate the slot synchronization at an extreme frame offset, the synchronization at a later stage (detection of the frame synchronization and code group/number) might be failed as well.

To solve the problems described above, it needs to develop a new apparatus for tracking a rough frequency or deriving a time offset in the intermediate operation of the cell searcher.

SUMMARY OF THE INVENTION

It is, therefore, an object of the present invention to provide an apparatus and a method for synchronizing frame and detecting a code group/number with a trackability of frequencies, taking advantage of code division multiple access (CDMA) demodulation that is featured by energy being diminished if a frequency goes off.

Another object of the present invention is to provide an apparatus and a method for synchronizing frame and detecting a code group/number with a trackability of frequencies in order to minimize degradation in an initial synchronization due to a frequency offset between a terminal and a base station.

To achieve the above objects, there is provided an apparatus for synchronizing frame and detecting a code group/number, which includes: an on time despreader for dispreading a receiving input by having a slot timing position designated after slot synchronization as a sampling point; an early time and a late time despreaders for dispreading a sampling point that is earlier or later than the sampling point of the on time despreader; a slew detector for detecting a time offset using energy of a despread signal outputted from the despreaders; a slew storage connected to the slew detector for storing an outputted slew value at the result of the time offset detection based on the energy of the outputted despread signal from the despreaders; a multiplexer for selecting one out of outputted values from the on time, the late time and the early time despreaders according to the output of the slew detector; an energy storage for storing outputted values of the multiplexer; a code group detector for detecting frame synchronization and code groups using the outputted values from the storage and from the slew storage, respectively; a code number detector for detecting code numbers using the outputted values from the slew storage and from the frame synchronization and code group detector, respectively; and a synchronous code generator for authorizing signals to each despreader by generating synchronous codes at a terminal for despreading (demodulation).

Another aspect of the present invention provides a method for synchronizing frame and detecting a code group/number, which includes the steps of: initiating slot synchronization at a time of system booting; detecting a time offset based on the designated position of a slot timing; and synchronizing frame and detecting code groups using the detected energy and the information.

The present invention is, therefore, very advantageous for preventing any degradation of a cell searcher that is often caused by timing changes (time offsets) according to the frequency offset between receiving signals and internally generated signals, using a tracking scheme. In consequence, it is now possible to have the initial cell searcher perform more accurate and faster base station's forward synchronization.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

FIG. 6 is a flow chart showing a forward frame synchronization and code group/number detection of an asynchronous code division multiple system.

DETAILED DESCRIPTION OF THE PREFERRED EMBODIMENT

Figure 1:
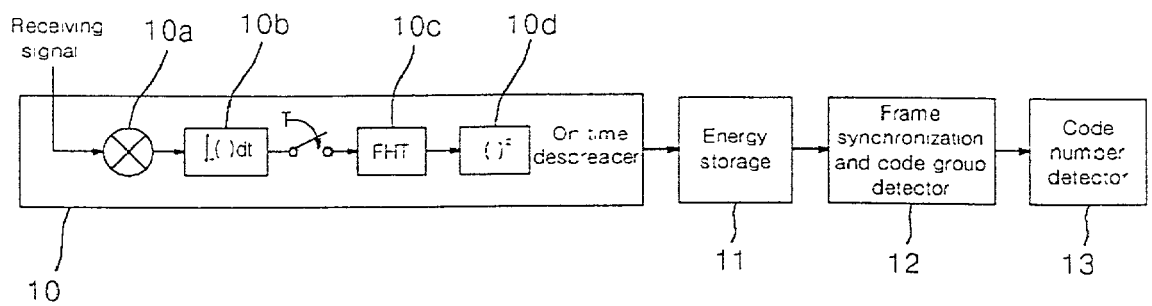
FIG. 1 is a block diagram showing an apparatus for synchronizing frame and code group in the related art.
Figure 2:
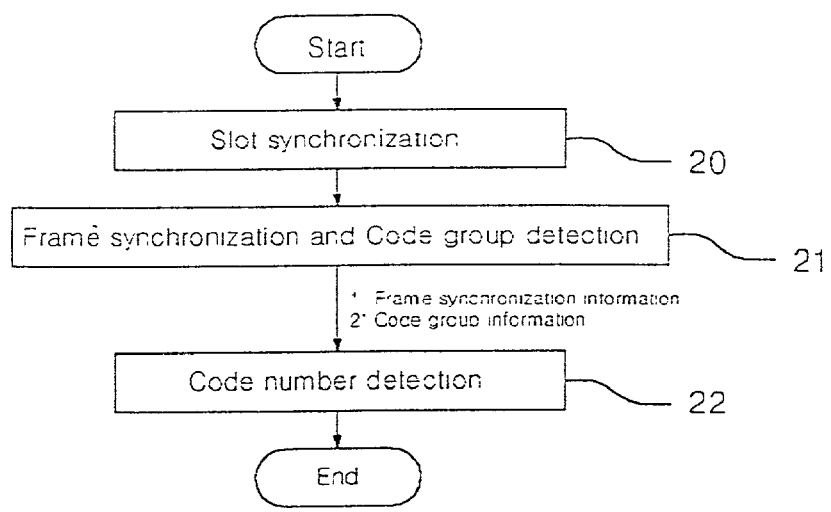
FIG. 2 is a flow chart showing an initial cell search for a forward synchronization in an asynchronous code division multiple system in the related art.

A configuration and operation of an apparatus for synchronizing frame and detecting a code group/number with a time offset/frequency trackability according to the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 4:
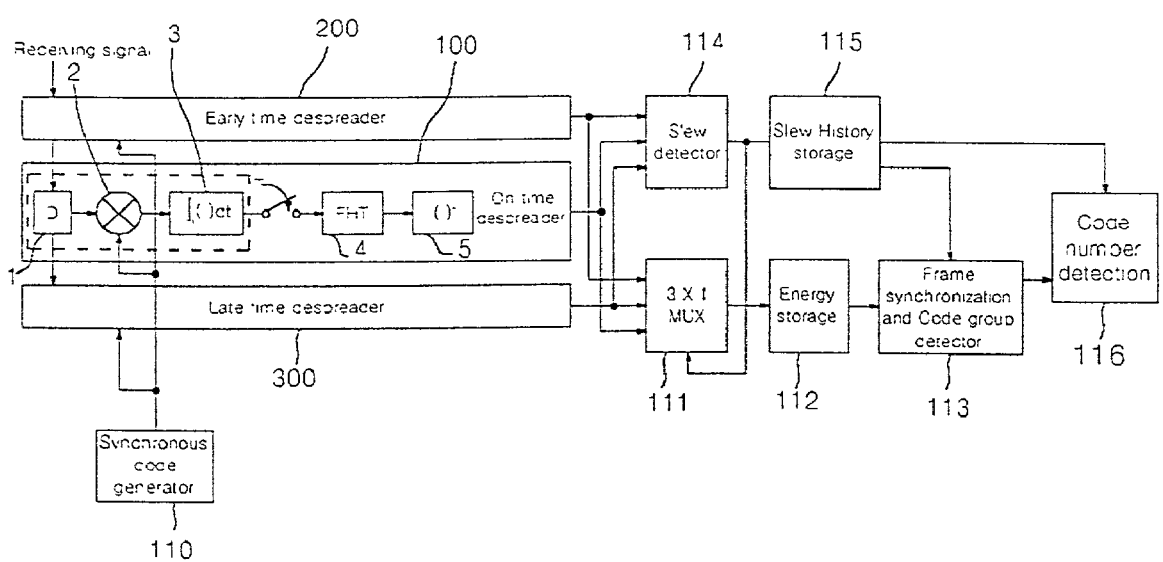
FIG. 4 is a block diagram showing an apparatus for synchronizing frame and detecting code group according to the present invention.

First of all, FIG. 4 is a block diagram illustrating an apparatus for synchronizing frame and detecting a code group/number in accordance with the present invention.

As shown in FIG. 4, the apparatus includes: an on time despreader 100 for dispreading a receiving input by having a slot timing position designated after slot synchronization as a sampling point; an early time despreader 200 and a late time despreader 300 for dispreading a sampling point that is earlier or later than the sampling point of the on time despreader; a slew detector 114 for detecting a time offset using energy of a despread signal outputted from the despreaders; a slew storage 115 connected to the slew detector for storing an outputted slew value at the result of the time offset detection based on the energy of the outputted despread signal from the despreaders; a multiplexer(MUX) 111 for selecting one out of outputted values from the on time, the late time and the early time despreaders according to the output of the slew detector; an energy storage 112 for storing outputted values of the multiplexer; a code group detector 113 for detecting frame synchronization and code groups using the outputted values from the storage and from the slew storage, respectively; a code number detector 116 for detecting code numbers using the outputted values from the slew storage and from the frame synchronization and code group detector, respectively; and a synchronous code generator 110 for authorizing local signals to each despreader by generating synchronous codes at a terminal for despreading (demodulation).

Every despreader, that is, the early time despreader, the on time despreader, and the late time despreader, includes a device 1 for getting receiving signals regarding the receiving signals on the early time, the on time, and the late time; an integrate-dump circuit composed of a multiplier 2 and an integrator 3 for operating outputs of a synchronous code generator 110 that generates internally generated signals (local signals) and outputs of the device 1; a fast hadamard transformer (FHT) 4 for performing a fast hadamard transformation on the integrate-dumped values; and a squarer 5 for obtaining despreaded energy values.

The initial cell search operation in the forward connection of the 3GPP(Global Partner Program) asynchronous International Mobile Telecommunication (IMT)-2000 system according to the present invention includes three steps, taking the properties of the synchronous channel into consideration.

Figure 5:
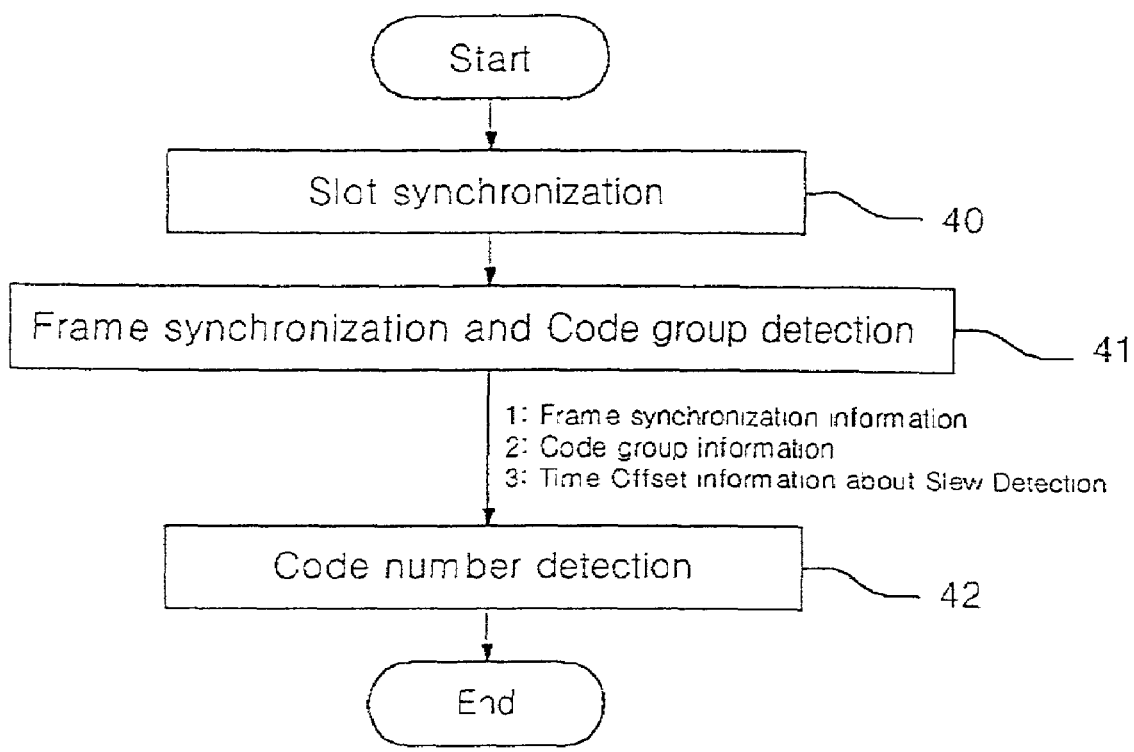
FIG. 5 is a general flow chart showing an initial cell search that is a forward synchronization of an asynchronous code division multiple system.

FIG. 5 is, for example, a flow chart illustrating the initial cell search concerning the forward synchronization of the asynchronous code division multiple IMT-2000 system.

As depicted in the flow chart, the first step involves slot synchronization using a primary synchronization code (S40), and the second involves synchronization of frames and detection of code groups using the slot synchronization (S41).

Preferably used channel here is a secondary synchronization channel.

Lastly, the third step involves detection of code numbers using the frame synchronization and code groups obtained from the first and the second steps, and confirmation the code numbers (S42).

Unfortunately though, the initial cell search process including the three steps aforementioned often generates frequency offsets due to the difference between the receiving signal's timing and the internally generated signal's timing. In order to solve such problem, the present invention installed three despreaders more to prevent any failure in synchronization, thereby providing specific time offset information obtained from slew detection to the apparatus for synchronizing frame and detecting a code group/number.

In other words, the synchronization of the slot is initiated at the time of system booting (S40).

Once the slot is synchronized, each spreader (100, 200, and 300) despreads the receiving input by having the designated position of the slot timing as the sampling point, and outputs the despread receiving input to the slew detector 114, and the MUX 11.

The energy storage 112 stores the energy of the spreader selected by outputs of the slew detector. And, the slew history storage informs which spreader generates the energy that has been outputted from the energy storage and provided to the frame synchronization and code group detector.

In this way, the time offset value derived by summing up the slew values, i.e., +, − and the like, is applied to the despreader's timing, it having been used for the frame synchronization. Then, the code detector detects code numbers therefrom.

The frame synchronization and code group detector 113 for detecting frame synchronization and code groups gains the information about the frame synchronization, the code group, and the time offset by the slew detection, based on the outputted values from the storage 112 and from the slew history storage, and outputs the information to the code number detector 116 (S41). Then, the internally generated timing against the receiving signal is advance, retarded or maintained in order to detect code numbers (S42).

FIG. 6 is a flow chart illustrating the procedure of the forward frame synchronization and code group/number detection of the asynchronous code division multiple system.

To begin with, the overall operation of the present invention is explained as follows.

As mentioned before, the present invention is devised to overcome the problems typically observed in the traditional apparatus for synchronizing frame and detecting code group/number, the problems including the degradation due to the difference in the receiving signal's timing and the internally generated signal's timing, and the failure in synchronization itself. As shown in FIG. 4, the present invention, unlike the traditional apparatus, includes three despreaders.

Figure 3:
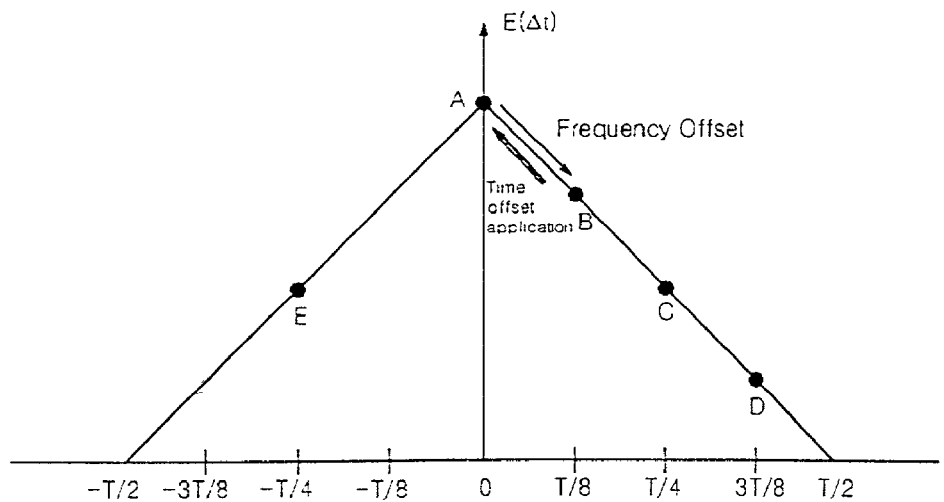
FIG. 3 diagrammatically shows states of detected energy values depending on differences of internally generated timing against receiving signals from an apparatus for synchronizing frame and code group according to the related art and the present invention.

Suppose that the position of the slot timing designated after the slot synchronization is B (referring to FIG. 3). The frame synchronization and code group detector starts at the very point B of the FIG. 3.

Then, as depicted in FIG. 4, the on time despreader 100 receives the samples from the sampling point in chips, and despreads the receiving input.

On the other hand, the late time despreader 200 despreads the receiving input by using later samples than the on time despreader 100 by $\Delta T$. Similarly, the early time despreader 300 despreads the receiving input by using earlier samples than the on time despreader 100 by $\Delta T$.

At this point, the $\Delta T$ should be smaller than Tc/4. Given that $\Delta T$ is Tc/8, the early time despreaded energy reaches the point A, while the late time despreaded energy reaches the point C (See FIG. 3).

From the comparison of the Points A, B, and C in FIG. 3, it becomes apparent that the point B, the present standard timing (sampling point), is slower than the receiving signal. Accordingly, the energy at the point A, not the energy at the point B being obtained from the slot synchronization result, should be used for the frame synchronization and the code group detection To be in short, the equivalent timing difference regarding the symmetry and the standard timing in FIG. 3, that is, the relation between the early timing energy with $\Delta T$ and the late time energy satisfies one of the below:

$$[(\text{Early time energy})-(\text{Late time energy})]>(\text{On time energy})/\alpha \qquad (1)$$

$$[(\text{Early time energy})-(\text{Late time energy})]<-(\text{On time energy})/\alpha \qquad (2)$$

In case of (1), the present standard timing is slower than the receiving signal's timing.

On the other hand, the relation between the early timing energy with AT and the late time energy falls in the case (2), the present standard timing is faster than the receiving signal's timing.

In this way, the present standard timing can be −(advanced), +(retarded) or maintained as much as the time offset, or the timing difference, to detect frame synchronization and a code group/number.

The slew detector 114 shown in FIG. 4 is a device using the characteristics of energy explained above.

The slew detector 114 selects one of the three despreaders in the frame synchronization and code group detector. Also, the slow detector 114 has the following functions:

1) If [(Early time energy)−(Late time energy)]>(On time energy)/α, the slew detector 114 controls the multiplexer 111 to make the values stored in the energy storage 112 be the early time despreaded energy;

2) If [(Early time energy)−(Late time energy)]<−(On time energy)/α, the slew detector 114 controls the multiplexer 111 to make the values stored in the energy storage 112 be the late time despreaded energy; and 3) For the cases other than the above, the slew detector 114 controls the multiplexer 111 to make the values stored in the energy storage 112 be the on time despreaded energy.

Here, the standard value is set to be (On time energy)/α in order to prevent the slew detector 114 from being degraded because of the noises mingled with the receiving signal. And, the 'α' is designated in such way that it can be complied with the changes in (Early time energy)−(Late time energy).

Once all essential energy is saved in the energy storage 112, the frame synchronization and code group detector 113 decides the frame synchronization and code groups.

The 'essential energy' or the number of energy to be saved varies depending on the schemes that are actually used for detecting frames and code groups.

To be more specific, there is 'Hard Decision' method and 'Soft Decision' method. Since the soft decision method is more preferable, the present invention will be explained based on this method.

The FHT shown in FIG. 4 generates 16 correlated signals in total, which means that each despreader generates 16 despreaded energies. The multiplexer 111 selects energies (16 from each despreader) outputted from the three despreaders, and stores individual energy in the slew detector based on the comparison result.

Therefore, the number of energy and the slew values saved in the energy storage 112 and the slew history storage 115 is 16 every time. For instance, if the detection procedure of frame synchronization and code groups is carried out for N slots, the total number of the stored energy and the slew history will be (16*N), respectively.

Suppose that the early despreader FHT output energies are E0, E1, E2, . . . E15, on time despreader FHT output energies are O0, O1, O2, . . . , O15, and the late time despreader FHT output energies are L0, L1, L2, . . . , L15.

The slew detector 114 first compares the energy of E0, O0, and L0. If it turns out that the early energy E0 is the largest, the multiplxer 111 saves the E0 in the energy storage 112, and the slew history storage records Advance (−) for this energy indexed with 0. Then, E1, O1, and L1 are again compared and are processed by the same method.

The method is applied until it reaches E15, O15, and L15. Actually, the very same method is applying to a next slot as well.

The frame synchronization and code group detector runs during a number of slots, and depending on the magnitude and direction of the relevant frequency offset to the time offset, it can shift the standard timing by Tc/8.

Since the same traditional method for detecting frame synchronization and code groups is employed to the present invention, more details on such method will not be provided here.

Meanwhile, the timing change information should be sent out to the code number detector, corresponding to the third step (42) of the initial cell search.

For a proper transfer of the timing change information, the slew history storage 115 is embodied. Later, this information, together with other information on the frame synchronization and code groups following the final operation of the frame synchronization and code group detector, is saved in the code number detector, which consequently activates the operation of the code group detector.

The slew history storage 115 receives every output of the slew detector 114 according to the FHT energy, and records how much slewing exists from the standard starting point to the final result point. Then, the slew history storage 115 sums up the slew values per energy used in accordance with the frame synchronization and code group detection method, and provides the timing value (+, −, or maintenance) derived here to the code detector where the timing value is used for the code detection procedure.

In short, individual slew value saved in the slew history storage is outputted to the energy storage, and in this way, it is known which despreader generated the energies used in the frame synchronization and code group detector. In addition, the sum of the slew values is used as the basic information to find out how to apply the time offset involving the timing of energies spent in the frame synchronization and code detector.

The following are to explain the procedure shown in FIG. 6.

First of all, the slot is synchronized using the primary scrambling code (S61).

Then, the on time despreader despreads (or demodulates) the receiving input by having the designated position of the slot timing as the on time sampling point (S62).

Similarly, the early (late) time despreader despreads the receiving input by having the designated position of the slot timing as the early (late) time sampling point, which is indeed earlier (later) than the on time sampling point (S63 & S64).

Using the difference in energies of the outputted despreaded signals from each despreader, the slew detector 114 detectors the time offset according to the present standard timing and the receiving signal's timing, which offset is later saved in the slew history storage 115 (S65).

The slew detector compares the outputted energies from each despreader, and controls the multiplexer to select one out of the despreaded energies, and the selected despreaded energy is saved in the energy storage 112 (S66).

Meanwhile, the frame synchronization and code group detection is accomplished by using the outputted energies from the energy storage and the output from the history storage, the output informing which despreader generated the energies. Afterwards, the slew history values corresponding to the energies used for the frame synchronization and code group detection are summed up, and the time offset, e.g., +, −, derived is applied to detect appropriate code numbers.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. An apparatus for synchronizing frame and detecting code group/number, comprising:
   an on time despreader for despreading a receiving input by having a slot timing position designated after slot synchronization as a sampling point;
   an early time and a late time despreaders for dispreading a sampling point that is earlier or later than the sampling point of the on time despreader;
   a slew detector for detecting a time offset using energy of a despread signal outputted from the despreaders;
   a slew storage connected to the slew detector for storing an outputted slew value at the result of the time offset detection based on the energy of the outputted despread signal from the despreaders;
   a multiplexer for selecting one out of outputted values from the on time, the late time and the early time despreaders according to the output of the slew detector;
   an energy storage for storing outputted values of the multiplexer; and
   a code group detector for detecting frame synchronization and code groups using the outputted values from the energy storage and from the slew storage, respectively.

2. The apparatus of claim 1, further comprising a code number detector for detecting code numbers using the outputted values from the slew storage and from the frame synchronization and code group detector, respectively.

3. The apparatus of claim 1, further comprising a synchronous code generator for authorizing signals to each despreader by generating synchronous codes at a terminal for despreading.

4. The apparatus of claim 1, wherein the slew detector, if [(Early time energy)−(Late time energy)] is greater than (On time energy)/α, controls the multiplexer to select an early time despreaded energy, wherein 'α' is designated to correspond to changes in the value of (Early time energy)−(Late time energy).

5. The apparatus of claim 1, wherein the slew detector, if [(Early time energy)−(Late time energy)] is smaller than −(On time energy)/α, controls the multiplexer to select a late time despreaded energy, wherein 'α' is designated to correspond to changes in the value of (Early time energy)−(Late time energy).

6. The apparatus of claim 4, wherein the (On time energy)/α is a standard value for preventing degradation of the slew detector that is caused by noises mingled with a receiving signal.

7. A method for synchronizing and detecting code group/number of an asynchronous mobile communication system having an initial cell search operation, the method comprising:
synchronizing a slot at a time of system booting;
detecting an energy and a time offset based on a designated position of the slot timing; and
detecting frame synchronization and a code group using the detected energy and information,
wherein the detecting the time offset further comprises:
dispreading for having the designated position of the slot timing as an on time sampling point through the slot synchronization;
early time dispreading for having an earlier sampling point than the on time sampling point;
late time dispreading for having a later sampling point than the on time sampling point;
controlling a multiplexer to select an energy by comparing outputted energies from each despreader;
storing slew values through the time offset detection by comparing outputted energies from each despreader; and
storing the outputted energies from the multiplexer.

8. The method of claim 7, wherein frame synchronization and code groups are detected by using the slew values through the time offset detection and the outputted values from the multiplexer that are stored.

9. The method of claim 7, wherein code number detection is accomplished by using the slew values through the time offset detection and the outputted values from the multiplexer.

10. The method of claim 7, wherein the controlling the multiplexer to select an energy by comparing the outputted energies from each despreader,
(a) if [(Early time energy)−(Late time energy)] is greater than (On time energy)/α, the slew detector controls the multiplexer to select an early time despreaded energy, thereby storing the early time despreaded energy in an energy storage;
(b) if [(Early time energy)−(Late time energy)] is smaller than −(On time energy)/α, the slew detector controls the multiplexer to select a late time despreaded energy, thereby storing the late time despreaded energy in an energy storage; and
(c) if [(Early time energy)−(Late time energy)] satisfies neither case (a) nor (b), the slew detector controls the multiplexer to select an on time despreaded energy, thereby storing the on time despreaded energy in an energy storage,
wherein 'α' is designated to correspond to changes in the value of (Early time energy)−(Late time energy).

11. The method of claim 7, wherein the storing the slew values through the time offset detection by comparing the outputted energies from each despreader, if [(Early time energy)−(Late rime energy)] is greater than (On time energy)/α, meaning that a present standard time is slower than a receiving signal's timing, the present standard timing is decreased to be the receiving signal's timing, making the present standard timing be the early despreaded energy and storing the retarded value as a slew value, wherein 'α' is designated to correspond to changes in the value of (Early time energy)−(Late time energy).

12. The method of claim 7, wherein the storing the slew values through the time offset detection by comparing the outputted energies from each despreader, if [(Early time energy)−(Late time energy)] is smaller than −(On time energy)/α, meaning that a present standard time is faster than a receiving signal's timing, the present standard timing is increased to be the receiving signal's timing, making the present standard timing be the late despreaded energy and storing the advanced value as a slew value, wherein 'α' is designated to correspond to changes in the value of (Early time energy)−(Late time energy).

13. The method of claim 8, wherein the detecting frame synchronization and code groups by using the slew values through the time offset and the outputted values from the multiplexer that are saved, the slew values are information to manifest which despreader generates the energy used for the frame synchronization and code group detection.

14. The method of claim 9, wherein the detecting code numbers by using the slew values through the time offset and the outputted values from the frame synchronization and code group detector, the slew values are increasing or decreasing timing information that is derived by summing the slew values.

15. The method of claim 14, wherein the code detector detects code numbers by using the increasing or decreasing timing information derived by summing the slew values corresponding to the energy used for the frame synchronization and code group detector, being stored in the slew value storage.

* * * * *